United States Patent [19]

Schwarz

[11] Patent Number: 5,293,610
[45] Date of Patent: Mar. 8, 1994

[54] MEMORY SYSTEM HAVING TWO-LEVEL SECURITY SYSTEM FOR ENHANCED PROTECTION AGAINST UNAUTHORIZED ACCESS

[75] Inventor: Roland H. Schwarz, Geneva, Switzerland

[73] Assignee: Motorola, Inc., Schaumburg, Ill.

[21] Appl. No.: 713,046

[22] Filed: Jun. 10, 1991

Related U.S. Application Data

[63] Continuation of Ser. No. 525,816, May 21, 1990, abandoned.

[30] Foreign Application Priority Data

Aug. 4, 1989 [GB] United Kingdom ............... 8917894

[51] Int. Cl.⁵ .......................................... G06F 12/14
[52] U.S. Cl. ................................ 395/425; 365/195; 365/201; 364/DIG. 2; 364/965.76; 364/969.4; 395/725; 380/3
[58] Field of Search ................ 395/425, 725; 364/200 MS File, 900 MS File; 365/228, 195, 201; 380/3, 4

[56] References Cited

U.S. PATENT DOCUMENTS

| | | | |
|---|---|---|---|
| 4,590,552 | 5/1986 | Guttag et al. | 395/425 |
| 4,698,750 | 10/1987 | Wilkie et al. | 395/425 |
| 4,777,586 | 10/1988 | Matsubara | 395/575 |
| 4,813,024 | 3/1989 | Lisimaque | 365/228 |
| 4,821,840 | 4/1989 | Nakamura et al. | 365/228 |
| 4,849,942 | 7/1989 | Farrugia | 365/228 |
| 5,014,191 | 5/1991 | Padgaonkar et al. | 395/425 |
| 5,175,840 | 12/1992 | Sawase et al. | 395/425 |

Primary Examiner—Glenn Gossage
Attorney, Agent, or Firm—Jonathan P. Mever; Joe E. Barbee

[57] ABSTRACT

A memory system, having security against unauthorized accessing of the contents of the memory system, comprises a first alterable memory (6), a second non-alterable memory (14, 16) and a data bus (5) for allowing external access to data stored in the memory system during a test mode of operation. The first alterable memory (6) comprises an options register (10) having a security bit (SEC) which, when programmed to an active state, prevents external access to the data stored in the first alterable memory during the test mode. The first alterable memory (6) further comprises a first data memory (8) having at least one security byte (VALSEC) which, when programmed to a predetermined state, prevents external access to the data stored in both the first alterable memory (6) and the second non-alterable memory (14, 16) during the test mode.

6 Claims, 2 Drawing Sheets

MEMORY SYSTEM HAVING TWO-LEVEL SECURITY SYSTEM FOR ENHANCED PROTECTION AGAINST UNAUTHORIZED ACCESS This application is a continuation of prior application Ser. No. 525,816, filed May 21, 1990, now abandoned.

This invention relates to a memory system having security against unauthorized accessing of the contents of the memory system. More particularly, the invention relates to a memory system for use with a microprocessor.

It is most desirable with microprocessors, having memories integrated on the same chip, to have some sort of security feature to protect the content of the memories from access by unauthorized persons. Generally, for most microprocessor applications, the memories will include non-volatile Electrically Erasable Read Only Memory (EEPROM) for storing data in a non-volatile manner and in some cases the application program.

For such applications, the microprocessor can be programmed to enter a test mode in order to test that it is functioning correctly. However, on entering a test mode, the entire contents of the EEPROM may be accessed by an external device under the control of the microprocessor: the microprocessor reads-out the contents of the EEPROM to an output port from which it can be externally accessed. Thus, an unauthorized person, having programmed the microprocessor to enter the test mode, can access the data and application program if it is stored in the EEPROM under the control of the microprocessor.

Typically, the EEPROM comprises a byte array. A well known method for protecting the contents of the EEPROM against unauthorized accessing during a test mode uses one bit of the byte array (hereinafter referred to as the security bit). The security bit is programmed into one of two states: an active state or an erased state. When the security bit is in the erased state, the test mode can be entered into, thereby allowing the contents of the EEPROM to be externally accessed from the output port. However, when the security bit is in the active state, the test mode cannot be entered into and thus, the content of the EEPROM is secure. Thus, the microprocessor can be tested by the manufacturer and/or the user and then the contents of the EEPROM can be secured against external access by programming the security bit to the active state using a simple program.

Once the microprocessor has been tested and the security bit programmed, the microprocessor verifies that the security bit in the EEPROM has been programmed to the active state, which may in some applications be a specifically defined value. If the security bit is not defined (i.e. not in the active state), the microprocessor can be programmed to enter a bootstrap mode by way of specific signals on selected pins of the microprocessor.

On entering the bootstrap mode the entire EEPROM content will be erased, including the security bit, whereby the microprocessor can be programmed to enter the test mode. Once the EEPROM is completely erased, the programming operation of the bootstrap mode is entered into whereby the EEPROM is programmed including the security bit which is programmed to the active state. Once the security bit has been programmed to the active state, the security bit can only be erased if the microprocessor enters a bootstrap mode.

This method of using a security bit can secure the application program and data if they are both stored in EEPROM. However, with the high volume production of microprocessors and since EEPROM is considerably more expensive than non-volatile Read Only Memory (ROM), it is not economical to store the entire application program in EEPROM. Therefore, some microprocessors use both ROM and EEPROM on the same chip: the ROM for storing the application program and the EEPROM for storing data.

For such microprocessors, the content of the EEPROM is protected by way of the security bit which prevents the microprocessor from entering the test mode. However, by erasing the content of the EEPROM during a bootstrap mode, which erases the security bit whereby the test mode can be entered into, the content of the ROM can be accessed during the test mode. Thus, an unauthorized person need only provide the specific signals to the selected pins of the microprocessor in order to enter the bootstrap mode and hence gain access to the application program stored in the ROM.

In order to enhance the security of the ROM and EEPROM it, is possible to write a few of the sub-routines of the application program to the EEPROM in order to avoid allowing access to the complete program following entry to the bootstrap mode. However, this has a disadvantage in that the sub-routines of the application program stored in the EEPROM are erased during the bootstrap mode which can affect the operation of the microprocessor. Another disadvantage is that invaluable memory space of the expensive EEPROM must be used to store the sub-routines instead of data which is written to and read from the EEPROM during operation of the microprocessor. In addition, many applications require a greater degree of security for the application than merely storing some of the sub-routines in the EEPROM: it is still possible for an unauthorised person to gain access to a large section of the application program in the ROM.

In accordance with the present invention there is provided a microprocessor comprising a memory system for storing data, the memory system comprising: a first alterable memory; a second non-alterable memory; and a data bus coupled to said first and second memories for allowing external access to data stored in the first and second memories during a test mode of operation of the memory system; the first alterable memory comprising first security means programmable to a predetermined active state whereby the memory system prevents access by a device external to the microprocessor to the data stored in the first alterable memory during the test mode of operation when said first security means is in the predetermined active state, and the first alterable memory further comprising second security means programmable to a predetermined state; and wherein the memory system prevents access by a device external to the microprocessor to the data stored in both the first and second memories during the test mode of operation when the first security means is in the predetermined active state and the second security means is in the predetermined state.

Thus, it will be appreciated that since the present invention uses one or more bytes of non-volatile EEPROM each, programmed to have specifically defined values in conjunction with a security bit to protect the contents of both the ROM and EEPROM, the present invention provides enhanced security against unauthorized accessing of the data contents of the memory.

In addition, it will be appreciated that since the present invention is relatively straightforward to implement, security can be enhanced cost effectively.

Two memory systems in accordance with the present invention will now be described, by way of example only, with reference to the accompanying drawings in which.

Figure 3:
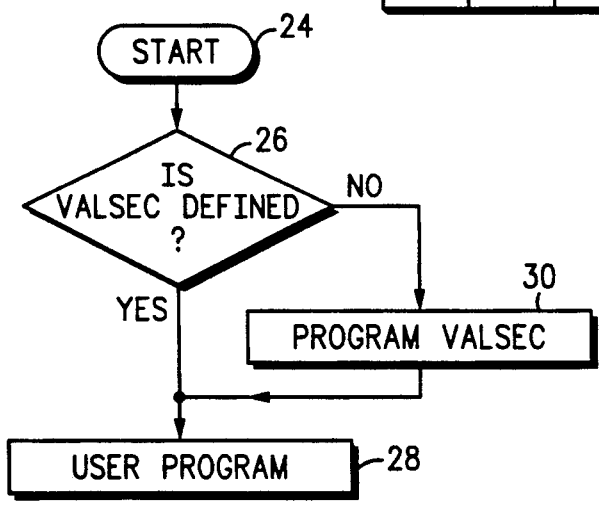
Figure 4:
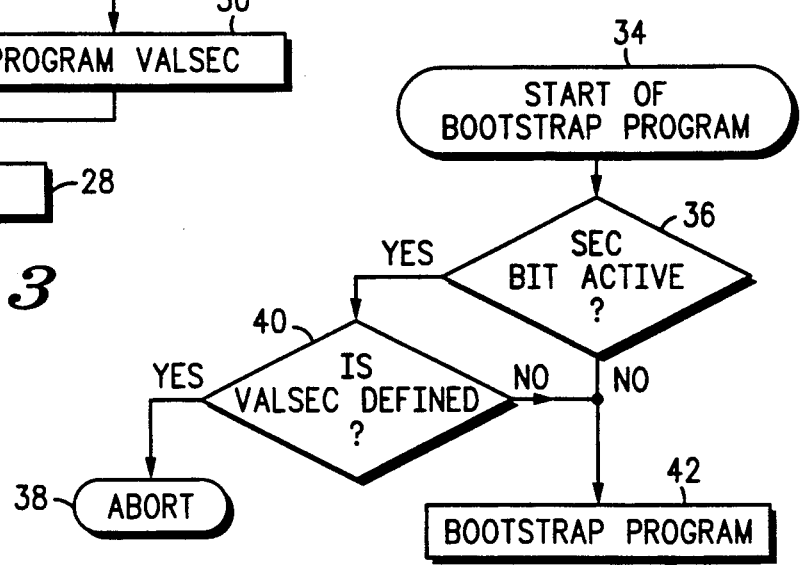
Figure 5:
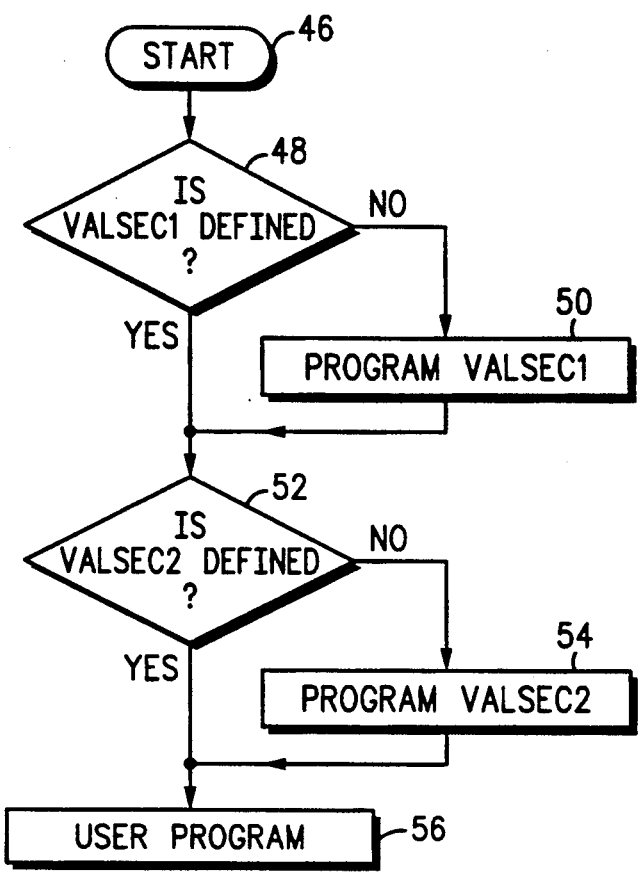
Figure 6:
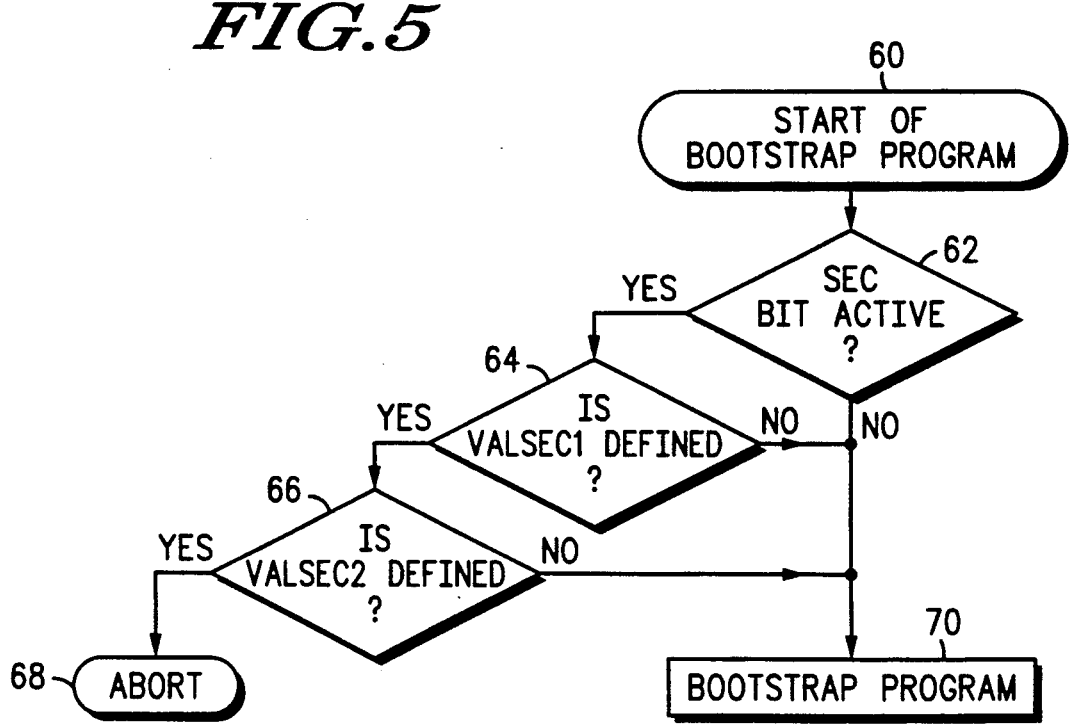

FIG. 3 comprises a flowchart showing the implementation of a first embodiment of the present invention;

FIG. 4 is a flowchart showing the operation of the first embodiment of the present invention;

FIG. 5 is a flowchart showing the implementation of a second embodiment of the present invention; and FIG. 6 is a flowchart showing the operation of the second embodiment of the present invention.

Figure 1:
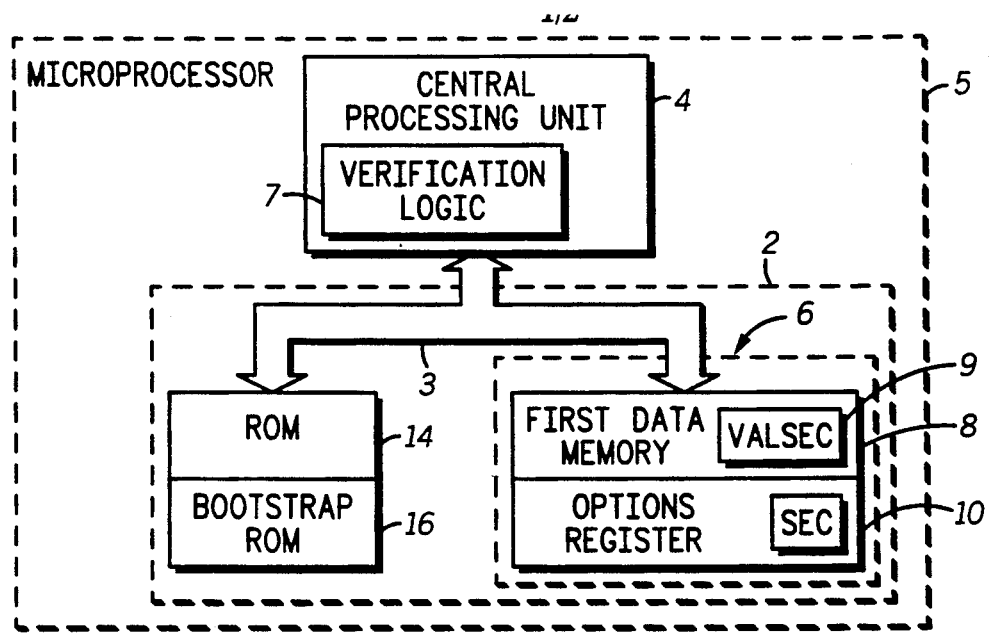
FIG. 1 is a block schematic diagram showing part of a memory system of a microprocessor having non-volatile memory incorporating the present invention.

FIG. 1 shows part of a microprocessor 5 comprising a Central Processing Unit (CPU) 4 and a memory system 2. The memory system 2 comprises non-volatile EEPROM 6, ROM 14 and bootstrap ROM 16. The CPU 4 communicates with the EEPROM 6, ROM 14 and bootstrap ROM 16 via an address and data bus 3.

Figure 2:
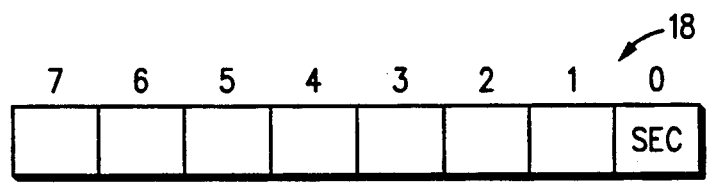
FIG. 2 shows a descriptive diagram of one byte of the non-volatile memory of FIG. 1.

In a preferred embodiment the EEPROM 6 is a 256 byte array and is arranged in two parts: an options register 10 and a first data memory 8. The EEPROM 6 comprises a plurality of bytes of memory cells, as is conventional, only one byte 18 of which is shown in FIG. 2. The first data memory 8 comprises 255 bytes of the EEPROM memory 6 to store data. The options register 10 comprises one byte (see FIG. 2, element 18 (of the EEPROM memory 6.

ROM 14 is a 5952 byte array and stores the application program. The bootstrap ROM 16 is a 368 byte array and contains a bootstrap program which can be used to program EEPROM 6.

FIG. 2 shows a description of each bit of the byte 18 of the options register 10 of the EEPROM 6. An unauthorized person can program the microprocessor to enter the test mode, and hence gain access to the contents of the EEPROM 6, by applying specific signals to the selected pins (not shown) of the microprocessor. As discussed above in order to protect the data content of the EEPROM 6, the byte 18 includes a security bit SEC. Once the test mode is initiated, verification logic 7 within microprocessor first verifies the state of the security bit SEC and, if the security bit is in the active state, the test mode cannot be entered into thereby securing the contents of EEPROM 6 and ROM 14. If the security bit SEC is in an erased state, the microprocessor can enter the test mode, which allows external access to the contents of EEPROM 6 and ROM 14.

The security bit SEC is generally programmed in the active state by the user after first testing the microprocessor device and, once programmed, the security bit can only be erased if the microprocessor enters a bootstrap mode. The microprocessor can be programmed to enter the bootstrap mode on application of specific signals to selected pins (not shown) of the microprocessor on entering the bootstrap mode, the bootstrap program stored in the bootstrap ROM 16 is executed, whereby the EEPROM 6 is erased including the security bit SEC. Since the SEC bit is erased, the contents of ROM 14 can be externally accessed. Once the EEPROM 6 is completely erased, the programming operation of the bootstrap program follows.

In order to increase the degree of security of the memory system 2, by protecting the content of the ROM 14 and bootstrap ROM 16, in the preferred embodiment of the invention, one byte 9 of the first memory 8 (hereinafter referred to as VALSEC byte) is used in conjunction with the security bit SEC of the options register 10 in order to prevent the microprocessor from entering the bootstrap mode.

The VALSEC byte can be any one byte 9 of the byte array of the first data memory 8 and its location is selected at the time of manufacturing. However, unless the VALSEC byte 9 has a specifically defined value, the VALSEC byte can be used by the application program; that is, data can be written to the VALSEC byte and the microprocessor can still enter the bootstrap mode.

Generally, the VALSEC byte 9 is programmed to a specifically defined value by the user of the microprocessor since this allows the user to test the microprocessor, via the bootstrap mode, prior to programming the VALSEC byte. However, the manufacturer of the microprocessor can also program the VALSEC byte. Having tested the device and once the security bit has been programmed in the active state, the user programs the VALSEC byte 9 by way of a simple routine stored in the ROM 14. As an alternative, the VALSEC byte could be programmed with the specifically defined value on the first power up of the microprocessor after testing.

The user program routine for programming a VALSEC byte is illustrated in the flowchart of FIG. 3.

The program starts at block 24. A check to see whether the VALSEC byte 9 is specifically defined is initiated at block 26. If the VALSEC byte is defined, the user program (i.e. the application program) is executed at block 28. If the VALSEC byte is not defined, the routine branches to program the VALSEC byte to a specifically defined value, at block 30. The user program is then executed at block 28.

If the VALSEC byte has a specifically defined value and the security bit SEC is in the active state, access to the bootstrap mode is prohibited. Thus, access to the program section used to erase the EEPROM 6 is prevented and the contents of the EEPROM 6, ROM 14 and bootstrap ROM are secured. If, however, the security bit is in the erased state, then the EEPROM 6 and ROM 14 contents are not secured regardless of the value of the VALSEC byte.

FIG. 4 is a flowchart illustrating the initialization of the bootstrap mode of operation.

The program starts at block 34. A check to see whether the security bit SEC is in the active state is initiated at block 36. If the security bit SEC is not in the active state, the bootstrap program is executed at 42. If the security bit is in the active state, the routine branches to determine whether the VALSEC byte has a specifically defined value, block 40. If the verification logic 7 determines that the VALSEC byte has the specifically defined value, the bootstrap program is aborted at 38 thereby preventing access to the program section used to erase the EEPROM 6. If the VALSEC byte does not have a defined value, the bootstrap program is executed at block 42.

Thus, once the VALSEC byte has been programmed with the specifically defined value and the security bit is in the active state, the microprocessor cannot enter the bootstrap program and hence the VALSEC byte and the security bit cannot be erased thereafter by an unauthorized person.

It will be appreciated that although the specific example described herein uses one VALSEC byte of the non-volatile EEPROM to provide another level of security in the memory system, two or more VALSEC bytes of the non-volatile EEPROM could also be used. Each of the VALSEC bytes can be programmed with different specifically defined values. An advantage of using two or more VALSEC bytes is that the probability that all the VALSEC bytes are programmed with their respective specifically defined values by mistake during manufacture is considerably reduced.

A second embodiment of the invention, which is similar to the embodiment described with reference to FIGS. 1-4 except that two bytes of EEPROM 6 are used, will now be described.

The user program routine for programming two VALSEC bytes is illustrated in the flowchart of FIG. 5.

The program starts at block 46. A check to see whether the first VALSEC byte (VALSEC) has a first specifically defined value is initiated at block 48.

If the first VALSEC byte is defined, a check to see whether the second VALSEC byte (VALSEC) has a specifically defined value is initiated at 52. If the first VALSEC byte is not defined, the routine branches to program the first VALSEC byte to the first specifically defined value, at block 50. The routine then returns to initiate a check at block 52 to see whether the second VALSEC byte has a second specifically defined value. If the second VALSEC byte is defined, the user program is executed at block 56. If the second VALSEC byte is not defined, the routine branches to program the second VALSEC byte to the second specifically defined value at block 54. The user program is then executed, block 56.

FIG. 6 is a flowchart illustrating the initialisation of the bootstrap mode of operation for the second embodiment of the invention.

The program starts at block 60. A check to see whether the security bit SEC is in the active state is initiated at 62. If the security bit SEC is not in the active state, the bootstrap program is executed at block 70. If the security bit is in the active state, the routine branches to determine whether the first VALSEC byte has a first specifically defined value, block 64. If the first VALSEC byte is not defined, the bootstrap program is executed at block 70. If the first VALSEC byte is defined, a check is then initiated at block 66 to see whether the second VALSEC byte has a second specifically defined value. If the second VALSEC byte is not defined, the bootstrap program is executed at block 70. If the second VALSEC byte has the second specifically defined value, the bootstrap program is aborted at block 68 thereby preventing the bulk erasure of EEPROM 6.

In summary, by using one or more byte locations in the non-volatile EEPROM of the memory system, which can be programmed with specifically defined values, in conjunction with the security bit, the present invention provides enhanced security for the data stored in the memory system.

The specific examples of the invention have been described wherein all the application program is stored in the ROM. However, it will be appreciated that the present invention can also be used to provide enhanced security where part of the application program is written to the EEPROM.

I claim:

1. A processor including a memory system for storing data, the memory system comprising:
   first alterable memory means;
   second non-alterable memory means; and
   data bus means coupled to said first and second memory means for allowing external access to data stored in said first and second memory means during a test mode of operation of said memory system;
   said first alterable memory means comprising first security means programmable to an active state wherein said memory system prevents access by a device external to the processor to the data stored in said first alterable memory means during said test mode of operation when said first security means is in said active state, and
   said first alterable memory means further comprising second security means programmable to a predetermined state; and
   wherein said memory system prevents access by a device external to the processor to the data stored in both said first and second memory means during said test mode of operation when said first security means is in said active state and said second security means is in said predetermined state.

2. A processor according to claim 1 wherein said first alterable memory means comprises a plurality of bytes of memory cells, and said first security means comprises one cell of one of said plurality of bytes of memory cells, said one cell having a predetermined value when said first security means is programmed to said active state.

3. A processor according to claim 1 wherein said first alterable memory means comprises a plurality of bytes of memory cells, and said second security means comprises at least one byte of said plurality of bytes of cells, said at least one byte having a predetermined value when said second security means is programmed to said predetermined state.

4. A processor according to claim 1 further comprising verification and access control means for verifying whether said first security means and said second security means are programmed to said active state and said predetermined state, respectively, and for preventing access to the data stored in both said first and said second memory means when said first security means is in said active state and said second security means is in said predetermined state.

5. A processor according to claim 1 wherein said first alterable memory means comprises non-volatile electrically erasable programmable read only memory.

6. A processor according to claim 1 wherein said second non-alterable memory means comprises read only memory.

* * * * *